April 14, 1959   W. J. BRADBURN, JR., ET AL   2,882,480
VOLTAGE REGULATOR
Filed Sept. 20, 1955
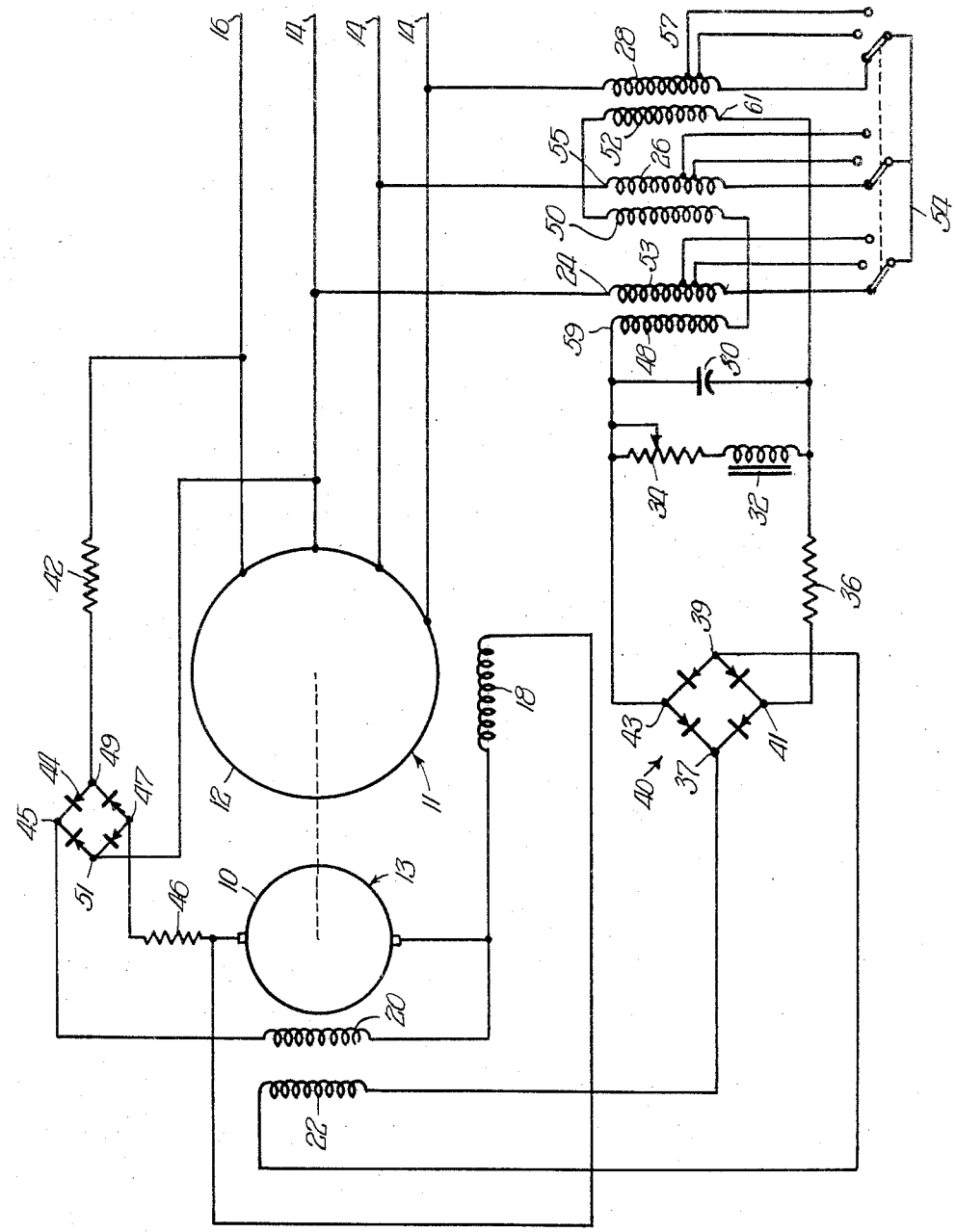
INVENTORS.
William J. Bradburn, Jr.,
Hans Richard Ansgar Hansen,
By Wilkinson, Huxley, Byron + Hume
attys United States Patent Office 2,882,480
Patented Apr. 14, 1959

2,832,480

VOLTAGE REGULATOR

William J. Bradburn, Jr., Milwaukee, and Hans Richard Ansgar Hansen, West Allis, Wis., assignors to The Louis Allis Co., Milwaukee, Wis., a corporation of Wisconsin Application September 20, 1955, Serial No. 535,370

5 Claims. (Cl. 322—28)

This invention relates to a novel static type voltage regulating system and has for an object to provide a voltage regulator which has no moving parts.

Another object of the invention is to provide an automatic voltage regulator which will maintain a closely regulated generator output voltage with normal load variations and normal speed changes in the prime mover.

A still further object of the invention is to provide a voltage regulator that is capable of operating indefinitely without attention.

Another object of the invention is to provide a voltage regulating system which takes all of its power from the source to be regulated.

Another specific object of this invention is to provide a voltage regulator that operates from a combined signal from all phases of a polyphase system.

Other objects of the invention will become apparent from the following description when taken in conjunction with the accompanying drawing in which the figure is a diagrammatic representation of one embodiment of this invention.

Referring now to the figure, a voltage regulating system is illustrated therein incorporating a three phase alternating current generator 11 with an armature 12, output leads 14, neutral lead 16 and a field winding 18. The field winding 18 of generator 11 is excited with direct current obtained from exciter 13. This exciter is composed of armature 10 and field windings 20 and 22. Field winding 20 is connected in series with the direct current terminals 45 and 47 of the full wave rectifier indicated generally by the numeral 44 and resistance 46 across the armature 10. One alternating current terminal 49 of rectifier 44 is connected through limiting resistor 42 to the neutral lead 16 of generator 11. The remaining alternating current terminal 51 of rectifier 44 is connected directly to one of the output leads 14 of generator 11.

The field winding 20 of exciter 13 is connected so that an increase in current through winding 20 will cause an increase in terminal voltage across the armature of exciter 13 and hence an increase in excitation current through field winding 18 of alternator 11. The field winding 22 of exciter 13 is connected so that an increase in current through winding 22 will cause a decrease in terminal voltage at the terminals of armature 10 of exciter 13 and hence will tend to decrease the excitation of field winding 18 of generator 11.

The field winding 22 is supplied with direct current from the direct current terminals 37 and 39 of the full wave rectifier indicated generally by the numeral 40. The primary windings 24, 26, and 28 of the three single phase transformers 53, 55, and 57 are star connected across the output leads 14 of generator 11. A tap changer switch 54 is provided to vary the number of active turns in the primary windings 24, 26, and 28 of the transformers 53, 55, and 57. The secondary windings 48, 50, and 52 of the previously mentioned transformers are connected in open delta, the output terminals being the opened delta terminals 59 and 61. A linear inductance 32 together with an adjustable series resistance 34 are connected in parallel with the capacitor 30 across the terminals 59 and 61. One terminal of resistor 36 is connected to alternating current terminal 41 of rectifier 40. The opposite alternating current terminal 43 of rectifier 40 and the opposite terminal of resistor 36 are also connected in parallel with the above-mentioned capacitor 30 and resistance-linear inductance 34 and 32 across the output terminals 59 and 61.

In operation, the excitation for the alternator field 18 is supplied from the exciter armature 10. The exciter 13 contains a self-excited shunt field winding 20 and a separately excited bucking control field winding 22. In order to stabilize the exciter 13 a series bias is added to the self-excitation through the rectifier 44. This bias is supplied from the output alternator 11 between one of the phase leads 14 and the neutral lead 16 and has no effect on the operation other than stabilization. The biasing resistor 42 and the shunt field resistance 46 are adjusted so as to insure the most stable operation with highest gain and best motor starting ability.

The exciter bucking field 22 receives its excitation from the rectified output of the secondaries 48, 50, and 52 of the frequency tripling transformer which consists of the three single-phase transformers 53, 55, and 57. The primary windings 24, 26, and 28 of the frequency tripling transformer, as previously stated, are star connected to the output phases 14. The secondary windings 48, 50, 52 are delta connected with one corner of the delta left open and used as the output terminals 59 and 61. Since the neutral of the frequency tripling transformer is not connected to the generator neutral 16, no third harmonic currents can flow in the transformer primary windings. Therefore, a third harmonic flux can be generated in the cores of the transformer. The sum of the fundamental frequency voltages induced in the transformer secondaries is zero, but the induced third harmonic frequency voltages are additive in the secondary windings. If the cores never operate above magnetic saturation the third harmonic output is negligible; however, if the cores saturate at some part of the cycle, the third harmonic output becomes appreciable and will increase directly as the primary voltage is increased.

When the generator voltage is great enough to attain magnetic saturation in the cores, and for a given change in output voltage, the change in third harmonic output, expressed as a percentage of the total third harmonic output is much greater than the change of alternator output expressed as a percentage of the total alternator output. It is this fact that makes the frequency tripling transformer useful in this regulator. With the capacitor 30 and bucking field load 22 connected across the output terminals 59 and 61, the percentage change ratio expressed above is further increased so that an extremely close regulator results.

In acting as a voltage regulator the circuit performs as follows: When the prime mover is started, the output voltage of the exciter 13 builds up and applies excitation to the field winding 18 of the alternator 11. So long as the output across leads 14 is so low that no saturation occurs in the cores of frequency tripling transformers 53, 55, and 57, the excitation of the exciter bucking field winding 22 is negligible and the output of exciter 13 is limited only by the resistance 46 in series with the shunt field 20. As the output voltage of alternator 11 approaches its rated value, saturation takes place in the cores of the transformers 53, 55, and 57 and the third harmonic output across terminals 59 and 61 starts building up. This applies a voltage to the bucking field winding 22 decreasing the excitation of the exciter 13 and finally bringing the excitation to the correct value to furnish the desired output voltage across leads 14. When load is placed on the alternator 11, the output voltage across leads 14 drops instantaneously. This causes a decrease in the current of bucking field winding 22 and results in an increase in total excitation of exciter 13. The excitation of the self-excited field winding 20 then increases and restores the output voltage across leads 14 to its correct value. When load is removed the opposite takes place so the excitation of exciter 13 is decreased back to its no load value.

The primary turns of the transformers 53, 55, and 57 can be varied by means of the tap changing switch 54. This permits operation at several different voltages corresponding to the number of taps available on the tap changing switch 54. Fine adjustment of the voltage is obtained by means of the adjustable resistor 34 in series with the linear inductor.

The advantages of this invention are apparent. The regulator operates entirely without the use of moving parts and is capable of functioning indefinitely without attention. No special adjustments are necessary after the regulator has been initially adjusted. Extremely fast response is possible since no intermediate stages of amplification are needed and the regulator works on an alternating current signal eliminating the need for special anti-hunt circuits. Very high motor starting ability is available since a forcing action is available when the alternator voltage drops. Parallel operation is available by the addition of a single air gap transformer. The regulator can be packaged in a small container and can be constructed to be housed entirely within the outline dimensions of the generator. Since the regulator maintains the generator output voltage within very close limits, the amount of material in the generator can be appreciably reduced initiating a substantial economic saving. Further, the system is constructed of substantially standard components and can be readily duplicated.

It is possible that changes in the specific form as disclosed herein can be made without departing from the teachings of this invention. For instance, although the form of the frequency multiplying transformer as used herein is preferred, other forms of frequency multipliers that give essentially the same output voltage characteristic as taught herein may also be used without departing from the scope of this invention. Although an exciter with two separate field windings is shown, it is apparent that the regulator can also be used in conjunction with an exciter that contains only a single field winding. It is also apparent that a series field winding could be employed on the exciter instead of the self-excited shunt field winding shown. The biasing circuit as shown herein could be constructed in a different form or could be eliminated entirely without a departure from the spirit of this invention. These and other modifications may be made to the embodiment of the invention disclosed herein without departing from the scope of the invention as set forth in the following claims.

We claim:

1. A regulating system for an alternating current generator comprising an exciter for energizing said generator, frequency multiplying means having pimary windings and secondary windings, said primary windings being connected to the output of said generator, a filter circuit connected to said secondary windings and tuned to the multiplied frequency, a rectifier connected to the output of said tuning circuit, self-excitation means for said exciter, means for applying a portion of the output from said generator to said self-excitation means for stabilizing the output of said generator, additional means for said exciter, and means connecting the output of said rectifier to said additional excitation means to provide control for said exciter in opposition to the control provided by said self-excitation means.

2. A regulating system for an alternating current generator comprising an exciter for energizing said generator, frequency multiplying means having primary windings and secondary windings, said primary windings being connected to the output of said generator, a filter circuit connected to said secondary windings and tuned to the multiplied frequency, a first rectifier connected to the output of said tuning circuit, self-excitation means for said exciter, means including a biasing resistor and a second rectifier connected across the output of said generator for applying a stabilizing current to said self-excitation means, additional excitation means for said exciter, and means connecting the output of said first rectifier to said additional excitation means to provide control for said exciter in opposition to the control provided by said self-excitation means.

3. A regulating system for a polyphase alternating current generator comprising an exciter for energizing said generator, frequency multiplying means having primary windings and secondary windings, said primary windings being connected to the output of said generator, a filter circuit including a capacitor and an inductor connected across the output of said secondary windings and tuned to the multiplied frequency, a rectifier connected to the output of said tuning circuit, a first field winding for said exciter connected across the output thereof to render said exciter a self-excited means, a feed back circuit including a biasing resistor and a second rectifier connected between the output of said generator and said first field winding for applying a stabilizing current to said winding, and a second field winding for said exciter, said second field winding being connected to said first rectifier to provide a field in opposition to that provided by said first field winding.

4. A regulating system for a polyphase alternating current generator comprising an exciter for energizing said generator, frequency multiplying means having primary windings and secondary windings, said primary windings being connected to the output of said generator, a filter circuit including a resistor and a linear inductor connected in parallel with a capacitor across the output of said secondary windings and tuned to the multiplied frequency, a rectifier connected to the output of said tuning circuit, a first field winding for said exciter connected across the output thereof to render said exciter a self-excited means, a feedback circuit including a biasing resistor and a second rectifier connected between the output of said generator and said first field winding for applying a stabilizing current to said winding, and a second field winding for said exciter, said second field winding being connected to said first rectifier to provide a field in opposition to that provided by said first field winding.

5. The regulating system set forth in claim 4 wherein said resistor is of a variable resistance for controlling the output voltage of said filter circuit.

References Cited in the file of this patent

UNITED STATES PATENTS

| 1,843,724 | Junken | Feb. 2, 1932 |
| 2,184,371 | Thompson | Dec. 26, 1939 |
| 2,561,804 | Leece et al. | July 24, 1951 |
| 2,644,127 | Bradley | June 30, 1953 |